G. M. HANGER.
HAND CORN THINNER AND WEEDER.
APPLICATION FILED JULY 13, 1908.
933,753.
Patented Sept. 14, 1909.
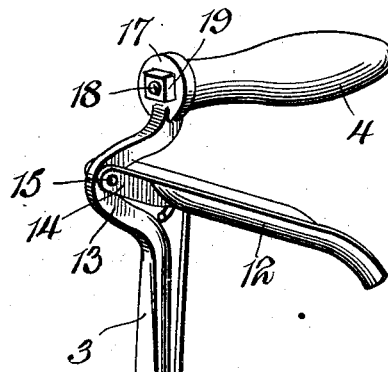
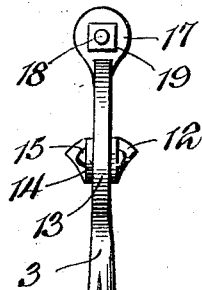
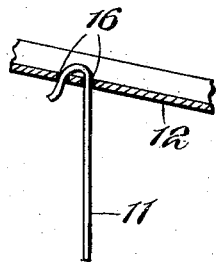
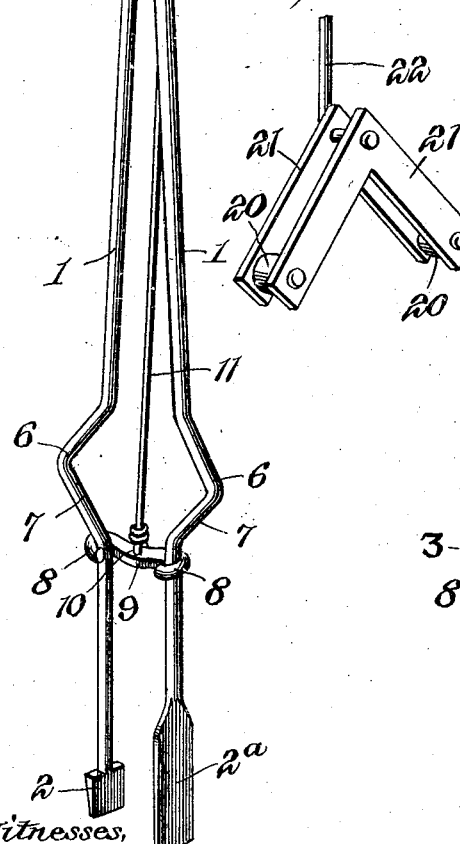
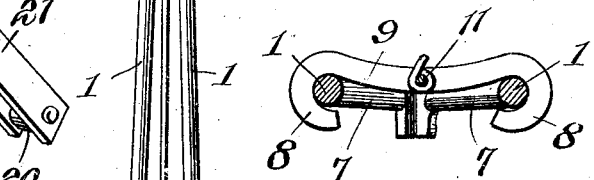
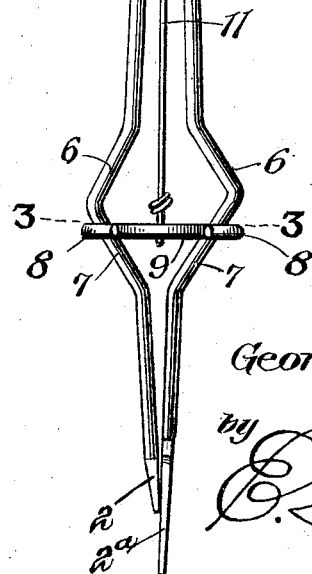
George M. Hanger, Inventor,
Witnesses, ated at his head office at Washington, D.C.

UNITED STATES PATENT OFFICE.

GEORGE MINER HANGER, OF BRIDGEWATER, VIRGINIA, ASSIGNOR TO DANIEL S. THOMAS AND JAMES A. FRY, OF BRIDGEWATER, VIRGINIA.

HAND CORN THINNER AND WEEDER.

933,753.

Specification of Letters Patent.  Patented Sept. 14, 1909.

Application filed July 13, 1908. Serial No. 443,224.

*To all whom it may concern:*

Be it known that I, GEORGE M. HANGER, a citizen of the United States, residing at Bridgewater, in the county of Rockingham and State of Virginia, have invented a new and useful Hand Corn Thinner and Weeder, of which the following is a specification.

The invention relates to a hand corn thinner and weeder.

The object of the present invention is to provide a simple and efficient hand corn thinner and weeder of great strength and durability, adapted to be cheaply manufactured, and capable of being conveniently operated with one hand for thinning corn, pulling weeds and analogous operations.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a hand corn thinner and weeder, constructed in accordance with this invention. Fig. 2 is a front elevation of the same. Fig. 3 is a horizontal sectional view, taken substantially on the line 3—3 of Fig. 2. Fig. 4 is a detail view, illustrating the manner of attaching the upper end of the connecting wire to the operating handle. Fig. 5 is a detail view, illustrating a modification of the operating mechanism for closing the laterally movable sides of the corn thinner and weeder.

Like numerals of reference designate corresponding parts in all the figures of the drawing.

The hand corn thinner and weeder is provided with a pair of laterally separable outwardly springing resilient sides 1, adapted to open automatically and provided at their lower ends with straight flat jaws 2 and 2ª and united at their upper ends to form a shank or stem 3, extending upwardly from the sides and carrying a horizontally disposed rearwardly extending handle 4. The jaws are formed integral with the sides 1, and the jaw 2ª, which is extended beyond the jaw 2 to form a projecting blade, consists of an oblong blade, tapered in thickness to enable it to readily penetrate the soil. The blade 2, which is approximately wedge-shaped, is tapered downwardly in thickness from its upper to its lower end and is located at a point intermediate of the ends of the other blade 2ª. The projecting portion of the blade 2ª enables the device to be easily operated with great accuracy to pull or pick young corn, or other plants or weeds for thinning out or removing such plants. The flat inner opposite faces of the jaws are adapted to securely grip the plants.

The lower portions of the sides are arranged at a slight angle when the jaws are in contact with each other, as illustrated in Fig. 2 of the drawing, and the jaws are slightly tapered in cross section to permit them to fit flat against each other. The sides or members 1 are provided at the lower portion with relatively short substantially V-shaped bends 6, located at a point intermediate of the ends of the sides or members and extending outwardly in opposite directions and forming lower downwardly converging portions 7, which are detachably embraced and engaged by hook-shaped terminals 8 of a slide 9. The slide 9 is constructed of a single piece of metal bent to form the hook-shaped terminals and curved slightly between the same to extend into the space between the V-shaped bends, as clearly illustrated in Fig. 3 of the drawing. The slide is movable upwardly and downwardly on the lower downwardly converging portions of the V-shaped bends to close the jaws and to permit the same to open. When the slide is moved upward on the downwardly converging portion 7, the jaws are drawn together and as soon as the slide is released, the resiliency of the sides or members 1 will force the slide downwardly and automatically open the jaws.

The slide is provided with a central perforation 10 to receive the lower end of a connecting wire 11, extending from the slide 9 to an operating lever 12, located adjacent to the handle 4 and curved in cross section to present a lower rounded or convex face to the hand of the operator. The shank or stem 3 is provided below the horizontal handle 4 with a substantially U-shaped bend 13, and the lever 12 has its inner end 14 bifurcated to straddle the bend 13 and pivoted to the same by a pin 15, or other suitable fastening device. The upper end of the wire 11 is secured to the lever 12 in perforations 16 thereof, but any other suitable connecting means may be employed for connecting the operating lever with the slide. The operating lever and the rearwardly extending handle 4 are adapted to be grasped simultaneously with one hand, and the operator by tightening his grip on the device draws the operating lever 12 upwardly toward the handle 4 and closes the jaws.

The upper end of the shank or stem is enlarged to form an ear 17, having a central perforation for the reception of a screw 18 of the handle 4, which is secured to the ear by a nut 19, arranged on the screw 18 and engaging the ear, as clearly shown in Fig. 1 of the drawing.

In Fig. 5 of the drawing is illustrated a modification of the invention, in which the operating mechanism for closing the laterally movable sides is equipped with anti-friction rollers 20 for reducing the friction to a minimum. The rollers, which are arranged to engage the exterior of the lower portions of the V-shaped bends 6, are located at the ends of a substantially V-shaped slide or connection, composed of inverted V-shaped sides 21, spaced apart to receive the sides of the corn thinner and weeder, and connected at their apexes with a rod 22, which is designed to extend to an operating lever similar to that heretofore described. The rollers 20, which are located between the lower ends of the inclined portions of the sides 21, are mounted on suitable pins or pivots, and the lower end of the rod 22 is bent at right angles and extended through perforations of the sides of the slide or connection; and when the latter is moved upward the corn thinner and weeder will be closed as before explained.

Having thus fully described my invention, what I claim as new and desire to secure by Letters Patent:—

1. A device of the class described including a pair of resilient automatically opening sides provided at an intermediate point with relatively short oppositely disposed V-shaped bends and having jaws, a slide embracing and engaging the said bends and movable along the same to close the jaws, a fixed handle connected with the sides, and a pivoted lever arranged adjacent to the handle and connected with the slide.

2. A device of the class described including a pair of resilient laterally separable automatically opening sides provided at an intermediate point with relatively short oppositely disposed substantially V-shaped bends and having jaws at their lower ends, a stem formed integral with and connecting the sides, a slide engaging the V-shaped bends, and means for operating the slide.

3. A device of the class described including a pair of resilient automatically opening sides having jaws and provided with angularly related portions, a slide having substantially hook-shaped terminals detachably engaging and embracing the angularly related portions, and operating mechanism connected with the slide.

4. A device of the class described including resilient sides provided with jaws and having V-shaped bends located at a point intermediate of the ends of the sides, said sides being also provided with an integral stem having a bend, a handle fixed to the upper end of the stem, a lever pivoted to the bend thereof, a slide engaging the V-shaped bends of the said sides, and means for connecting the slide with the lever.

5. A device of the class described including a pair of laterally movable sides provided at their lower ends with straight flat integral jaws having straight side edges and straight lower end edges and presenting inner flat engaging faces to each other, one of the jaws being relatively short and tapered in thickness from its upper to its lower end, and the other jaw being oblong and extended a considerable distance beyond both ends of the relatively short jaw and forming a lower projecting blade, and means for operating the jaws.

In testimony, that I claim the foregoing as my own, I have hereto affixed my signature in the presence of two witnesses.

GEORGE MINER HANGER.

Witnesses:
J. S. NISWANDER,
G. RICHARD BERLIN.